Figure 1:
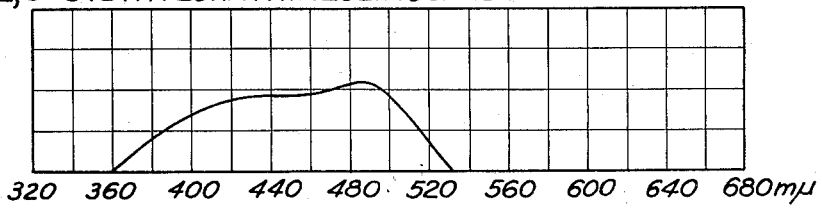

Jan. 12, 1943.   L. G. S. BROOKER   2,307,916
UNSYMETRICAL THIAZOLINOCARBOCYANINE DYE
AND PHOTOGRAPHIC EMULSION
Filed April 7, 1938

2,3'-DIETHYLOXATHIAZOLINOCARBOCYANINE IODIDE.

2-ETHYL-3'-METHYLTHIATHIAZOLINOCARBOCYANINE IODIDE.

2-ETHYL-3'-METHYLSELENATHIAZOLINOCARBOCYANINE IODIDE.

1'-ETHYL-3-METHYLTHIAZOLINO-2'-CARBOCYANINE IODIDE.

Leslie G. S. Brooker
INVENTOR

BY
ATTORNEYS

Patented Jan. 12, 1943

2,307,916

UNITED STATES PATENT OFFICE 2,307,916

UNSYMMETRICAL THIAZOLINOCARBOCYANINE DYE AND PHOTOGRAPHIC EMULSION

Leslie G. S. Brooker, Rochester, N. Y., assignor to Eastman Kodak Company, Rochester, N. Y., a corporation of New Jersey Application April 7, 1938, Serial No. 200,697

4 Claims. (Cl. 260—240)

This invention relates to unsymmetrical thiazolinocarbocyanine dyes, to a process for the preparation thereof and to photographic emulsions sensitized therewith.

When cyclammonium salts, such as benzoxazole, benzothiazole, benzoselenazole, naphthoxazole, naphthothiazole and quinoline quaternary salts, containing a β-arylaminovinyl group in the alpha or gamma position, i. e. in one of the so-called reactive positions, are treated with basic condensing agents, symmetrical carbocyanine dyes are formed with greater or lesser ease depending upon the cyclammonium salt treated. I have now found that if 2-methylthiazoline quaternary salts are admixed with the aforesaid β-arylaminovinyl quaternary salts and the mixture treated with basic condensing agents, unsymmetrical thiazolinocarbocyanine dyes are formed together with the symmetrical carbocyanine dyes. I have found that the unsymmetrical thiazolino dyes can be separated from the symmetrical dyes by extracting the symmetrical dyes from the unsymmetrical dyes with alcohols, advantageously alcohols of the formula $C_nH_{2n+1}OH$ wherein $n$ represents 1, 2 or 3.

It is accordingly an object of my invention to provide unsymmetrical thiazolinocarbocyanine dyes. A further object is to provide a process for the preparation of such dyes. A still further object is to provide photographic emulsions sensitized with my new dyes. Other and more specific objects will appear hereinafter.

My new dyes can be represented by the following general formula:

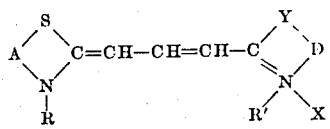

wherein A represents an ethylene group and D represents a phenylene group or a naphthylene group, when Y represents an oxygen or a sulfur atom or a vinylene group, and D represents a phenylene group when Y represents a selenium atom, R and R' represent alkyl or alcohol groups or radicals, such as methyl, ethyl, n-butyl, iso-amyl, allyl, benzyl, β-ethoxyethyl, β-chloroethyl, β-carbethoxyethyl, or decyl for example, and X represents an acid radical, such as halide, alkylsulfate, perchlorate or toluenesulfonate for example.

In preparing my new dyes according to my invention, I react a benzoxazole, a benzothiazole, a benzoselenazole, a naphthothiazole, a naphthoxazole or a quinoline quaternary salt containing a β-arylaminovinyl group in the alpha position with a 2-methylthiazoline quaternary salt, in the presence of a basic condensing agent. The β-arylaminovinyl quaternary salts are advantageously employed as alkiodides, although alkyl perchlorates, alkyl sulfates or alkyltoluenesulfonates for example, can be employed. The 2-methylthiazolone quaternary salts are advantageously employed as alkyl toluenesulfonates, although alkiodides or other quaternary salts can be employed. When sodium or potassium carbonates, sodium or potassium acetates or strong organic bases are employed as basic condensing agents, a diluent is advantageously employed. Lower aliphatic alcohols of the formula $C_nH_{2n+1}OH$ wherein $n$ represents 1, 2, 3 or 4 are advantageously employed as diluents. By strong organic base, I mean an organic base whose aqueous solution has a dissociation constant substantially greater than that of an aqueous solution of pyridine. Typical strong organic bases are piperidine, triethylamine, triethanolamine and diethylamine for example. When pyridine itself is employed as a basic condensing agent, no diluent need be employed as an excess of the pyridine serves as an excellent reaction medium. The β-arylaminovinyl quaternary salts which I employ are well known substances. Advantageously, I employ β-phenylaminovinyl (β-anilino-vinyl) quaternary salts which may be acylated with acetic, propionic or butyric anhydrides for example. Heat accelerates the formation of my new dyes.

My new unsymmetrical thiazolinocarbocyanine dyes are formed along with symmetrical carbocyanine dyes which do not contain a thiazolino nucleus. The quantity of symmetrical dye formed depends upon the nature of the β-arylaminovinyl quaternary salt employed. To remove the unsymmetrical thiazolinocarbocyanine dye, I extract the crude dye mixture with an alcohol. The symmetrical dye passes into solution leaving the unsymmetrical thiazolinocarbocyanine dye. In some cases repeated extraction is necessary, while in others a single extraction suffices to remove the symmetrical dye fairly well.

While the process of preparing my new dyes is subject to variation, particularly as respects the nature and quantity of the β-arylaminovinyl quaternary salts employed, the nature and quantity of 2-methylthiazoline quaternary salts employed, the nature and quantity of basic condensing agent employed, the nature and quantity of diluent employed, if any, the time of reaction employed, the temperatures employed and the method of isolation and purification of the dyes, the following examples will serve to illustrate my invention. These examples are not intended to limit my invention.

EXAMPLE 1.—*2-ethyl-3'-methylselenathiazolino-carbocyanine iodide*

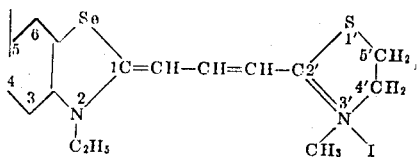

0.75 g. (1 mol. plus about 50% excess) of 2-methyl-thiazoline was heated with 1.4 g. (1 mol. plus about 50% excess) of methyl-p-toluenesulfonate at about 100° C. for about thirty minutes. The initial reaction was very vigorous. The reaction product was dissolved in 15 cc. of anhydrous pyridine. The resulting solution was brought nearly to a boil when 2.5 g. (1 mol.) of 1-(β-acetanilidovinyl)-benzoselenazole ethiodide were added. The resulting mixture was heated at the refluxing temperature for about ten minutes. The mixture became red. It was allowed to cool. Crystals formed. 20 cc. of water were added. Crystals were filtered off. The filtrate was diluted to 150 cc. with warm water and allowed to cool. The crystals which formed were filtered off. The two batches of crystals were boiled with a small amount of acetone to remove tarry matter. The resulting mixture was cooled and the solid material filtered off. The solid was boiled with a small amount of methyl alcohol. The resulting solution was cooled. The small amount of solid material was filtered off. It was recrystallized from methyl alcohol and obtained as very dark needles some of the faces of which had a blue and others a green reflex. These dark crystals were the unsymmetrical thiazolino dye. They gave an orange methyl alcoholic solution.

EXAMPLE 2.—*2-ethyl-3'-methylthiathiazolinocarbocyanine iodide*

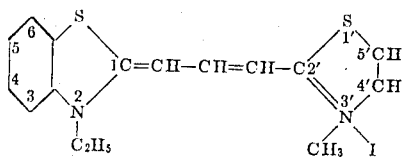

2 g. (1 mol. plus about 50% excess) of 2-methylthiazoline were heated with 3.7 g. (1 mol. plus about 50% excess) of methyl-p-toluenesulfonate at about 100° C. for from thirty to forty minutes. The initial reaction was very vigorous. The reaction product was dissolved in 40 cc. of boiling anhydrous pyridine. 8.2 g. (1 mol.) of acetylated 1-(β-anilinovinyl)-benzothiazole ethiodide were added to the hot pyridine solution. Heating at the refluxing temperature was continued for about three minutes. A deep red coloration developed. Crystals separated out and the reaction mixture set to a sludge. Heating was continued for ten further minutes. The reaction mixture was cooled and the crystals filtered off. They were washed with 20 cc. of pyridine. They were then placed in 100 cc. of methyl alcohol and the alcohol was brought to a boil. To the boiling solution, 5 g. of potassium iodide dissolved in 50 cc. of water were added. The resulting mixture was allowed to cool and stand until crystallization was complete. The crystals were filtered off, washed first with 70 cc. of cold water and then 60 cc. of cold acetone. The residue was boiled with 200 cc. of methyl alcohol. The methyl alcohol solution was filtered hot. The residue was dissolved in 250 cc. of hot methyl alcohol. The methyl alcoholic solution was allowed to cool and stand for about 12 hours. The crystals which formed were filtered off and washed with 40 cc. cold methyl alcohol and then dried. The crystals were the unsymmetrical thiazolino dye and were in the form of beautiful garnet red needles having a greenish reflex.

EXAMPLE 3.—*2-ethyl-3'-methyloxathiazolino-carbocyanine iodide*

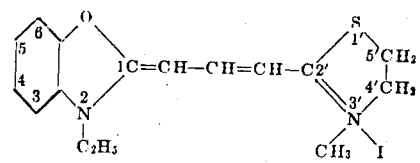

3 g. (1 mol. plus about 50% excess) of 2-methylthiazoline were heated with 5.6 g. (1 mol. plus about 50% excess) of methyl-p-toluenesulfonate at about 100° C. for about thirty minutes. The initial reaction was vigorous. The reaction product was dissolved in 40 cc. of boiling anhydrous pyridine. To the boiling solution, 7.8 g. (1 mol.) of acetylated 1-(β-anilinovinyl)-benzoxazole ethiodide were added. A deep orange-yellow coloration developed. 5 g. of potassium iodide dissolved in 50 cc. of water were added to the reaction mixture and the whole was allowed to cool and stand for about 12 hours. The crystals which separated were filtered off and washed with cold water (45 cc.) followed by acetone (10 cc.). The washed product was recrystallized from methyl alcohol and obtained as minute orange needles having a bluish reflex. These crystals were the unsymmetrical thiazolino dye.

EXAMPLE 4.—*2,3'-diethylthiathiazolinocarbocyanine iodide*

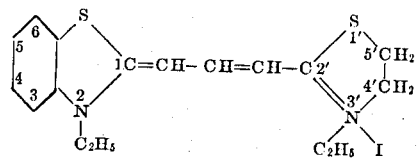

2 g. (1 mol. plus about 50% excess) of 2-methylthiazoline were heated with 4 g. (1 mol. plus about 50% excess) of ethyl-p-toluenesulfonate for about two hours at about 100° C. The reaction product was mixed with 30 cc. of cold anhydrous pyridine. To this mixture, 8.2 g. of 1-(β-anilinovinyl)-benzothiazole were added with stirring. Upon warming, reaction occurred. The mixture was heated at the refluxing temperature for about 10 minutes. A deep red coloration developed. 10 g. of potassium iodide dissolved in 50 cc. of water were added to the hot pyridine mixture. The resulting mixture was allowed to stand at about 0° C. for about 12 hours. The solid material was then filtered off and washed first with cold water (25 cc.) and then with 25 cc. of cold acetone. The resulting reddish-brown crystals were recrystallized from 100 cc. of methyl alcohol. The resulting crystals were washed with 30 cc. of methyl alcohol. They were in the form of minute purplish-brown needles having a bright reflex. Their methyl alcoholic solution was pinkish. They were the unsymmetrical thiazolino dye.

EXAMPLE 5.—*1'-ethyl-3-methylthiazolino-2'-carbocyanine iodide*

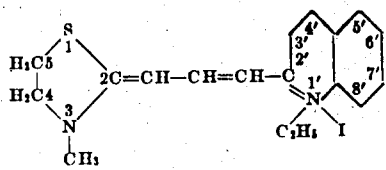

3 g. (1 mol. plus about 50% excess) of 2-methylthiazoline were heated with 5.6 g. (1 mol. plus about 50% excess) at about 100° C. for about thirty minutes. The initial reaction was vigorous. The reaction product was dissolved in 40 cc. of boiling anhydrous pyridine. To the boiling solution, 8 g. of acetylated 2-(β-anilinovinyl)-quinoline ethiodide were added. The resulting mixture was heated at the refluxing temperature for about 10 minutes. 5 g. of potassium iodide dissolved in 50 cc. of water were added to the reaction mixture and the whole was allowed to stand for about 12 hours. The crystals which formed were filtered off and washed with cold water (50 cc.) and then with cold acetone (50 cc.). The dried crystals were dissolved in 200 cc. of hot methyl alcohol. Upon allowing the solution to cool, two different kinds of crystals were deposited, viz. large brownish needles which gave a red methyl alcoholic solution and smaller needles which gave a blue methyl alcoholic solution. The larger needles were separated from the smaller mechanically. The larger needles were the unsymmetrical thiazolino dye.

EXAMPLE 6.—*2,3'-diethyloxathiazolinocarbocyanine iodide*

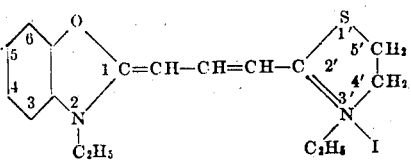

1.3 g. (1 mol.) of 2-methylthiazoline ethiodide, 2.17 g. (1 mol.) of 1-(β-acetanilidovinyl)-benzoxazole ethiodide and 0.82 g. of anhydrous sodium acetate were heated in 15 cc. of absolute ethyl alcohol at about 100° C. for about 30 minutes. A dark reddish-orange color formed. The reaction mixture was allowed to stand at 0° C. for about 12 hours. The solid which separated was filtered off and washed with acetone. It was then extracted with 20 cc. of hot methyl alcohol. The extract was allowed to stand at 0° C. for about 3 hours. The crystals which separated were filtered off and washed with a very small amount of cold methyl alcohol. The crystals were recrystallized from 10 cc. of methyl alcohol and obtained as orange crystals which gave a yellow methyl alcohol solution.

As 2-methylthiazoline quaternary salts, I have employed as illustrations in the formation of my new dyes only the common and more readily available 2-methylthiazoline quaternary salts which are devoid of substituents in the 4- and 5-positions. However, 2-methylthiazoline quaternary salts containing substituents in the 4- and 5-positions can be employed. For example, quaternary salts of 2,5-dimethylthiazoline can be employed. 2,5-dimethylthiazoline is described by Gabriel and von Hirsch in Berichte der deutschen chemischen Gesellschaft, vol. 29, page 2611 et. seq.

The following examples illustrate the preparation of β-arylaminovinyl quaternary salts. These examples are not intended to limit my invention.

EXAMPLE 7.—*1-(β-acetanilidovinyl)-benzoxazole ethiodide*

58 g. (1 mol.) of 1-methylbenzoxazole ethiodide and 40 g. (1 mol.) of diphenylformamidine were heated at the refluxing temperature in 250 cc. of acetic anhydride for about 20 minutes. The reaction product separated from the chilled reaction mixture.

EXAMPLE 8.—*1-(β-acetanilidovinyl)-benzothiazole ethiodide*

67 g. (1 mol.) of 1-methylbenzothiazole ethiodide and 48 g. (1 mol.) of diphenylformamidine were heated at the refluxing temperature in 365 cc. of acetic anhydride for about 20 minutes. The reaction product separated from the chilled reaction mixture.

EXAMPLE 9.—*2-(β-acetanilidovinyl)-quinoline ethiodide*

60 g. (1 mol.) of quinaldine ethiodide and 40 g. (1 mol.) of diphenylformamidine were heated at 180° C. for about 10 minutes. The cooled reaction mixture was ground with acetone and filtered. 20 g. of this product—2-(β-anilinovinyl)-quinoline ethiodide—were refluxed with 50 cc. of acetic anhydride for about 10 minutes. The reaction mixture was chilled and the 2-(β-acetanilidovinyl)-quinoline ethiodide separated. It was filtered off and washed with acetone.

Alternatively, I can prepare my new dyes by condensing a 2-formylmethylene-3-alkylthiazolidine with a 1-methylbenzoxazole, a 1-methylbenzothiazole, a 1-methylbenzoselenazole, a 1-methyl-α-naphthoxazole, a 1-methyl-α-naphthothiazole, a 2-methyl-β-naphthoxazole, a 2-methyl-β-naphthothiazole or a 2-methylquinoline (quinaldine) quaternary salt, in the presence of a water-binding agent. As water-binding agents, anhydrides of organic acids, such as acetic, propionic or butyric acids, are advantageously employed. Heat accelerates the formation of my new dyes.

While this alternative method of preparing my new dyes is subject to variation, particularly as respects the nature and quantity of the formylmethylene compound employed, the nature and quantity of the cyclammonium quaternary salt employed, the nature and quantity of the water-binding agent employed, the temperatures employed, the time of reaction employed and the method of isolation and purification of the dyes, the following example will serve to illustrate the manner of practicing my invention. This example is not intended to limit my invention.

EXAMPLE 10.—*1'-ethyl-3-methylthiazolino-2'-carbocyanine iodide*

0.71 g. (1 mol.) of 2-formylmethylene-3-methylthiazoline and 2.99 g. (2 mol.) of quinaldine ethiodide were heated at the refluxing temperature in 15 cc. of acetic anhydride for about 7 minutes with stirring. The cooled reaction mixture was stirred with 150 cc. of diethyl ether and the ether mixture was chilled several hours at 0° C. The product which separated was boiled with 20 cc. of acetone and the acetone mixture was chilled at 0° C. The solid product was filtered off and stirred with warm water. The solid product was again filtered off and boiled with 20 cc. of acetone and the acetone mixture was chilled at 0° C. The solid product was filtered off and twice recrystallized from 95% ethyl alcohol to yield dull red needles having a blue reflex.

2-formylmethylene-3-alkylthiazolidines are described in my copending applications Serial No. 95,925, filed August 13, 1936 (now U. S. Patent 2,165,218, dated July 11, 1936), and Serial No. 198,106, filed March 25, 1938 (now U. S. Patent 2,165,692, dated July 11, 1939). See British Patent 466,268.

Cyclammonium aralkyl quaternary salts are described in the copending application of Leslie G. S. Brooker and Lloyd A. Smith, Serial No. 175,686, filed November 20, 1937 (now U. S. Patent 2,233,511, dated March 4, 1941) and cyclammonium alkoxyalkyl, carbalkoxyalkyl and chloralkyl quaternary salts are described in the copending application of Leslie G. S. Brooker and Lloyd A. Smith, Serial No. 180,214, filed December 16, 1937 (now U. S. Patent 2,231,658, dated February 11, 1941). Cyclammonium hydroxyalkyl quaternary salts are described in the copending application of Leslie G. S. Brooker and Lloyd A. Smith, Serial No. 133,524, filed March 29, 1937 (now U. S. Patent 2,213,238, dated September 3, 1940).

My new dyes sensitized photographic emulsions in a novel and useful manner. My new dyes sensitize emulsions to the blue and green. My invention is especially directed to the customarily employed silver halide, particularly the silver chloride and bromide emulsions, which may contain other salts which may be light sensitive. My invention is further particularly directed to the customarily employed gelatin emulsions. However, the gelatin can be replaced with any carrier which has substantially no deleterious effect on the light-sensitive materials, e. g. with a cellulose derivative or a resin.

In the preparation of photographic emulsions sensitized with my new dyes, it is only necessary to thoroughly disperse a small amount of my new dyes in an ordinary photographic emulsion. The suitable and most economical concentration for any given emulsion will be apparent to those skilled in the art upon making the ordinary tests and observations customarily used in the art of emulsion making. To prepare a gelatino-silver-halide emulsion, the following procedure is satisfactory: A quantity of the dye is dissolved in a suitable solvent, for example methyl alcohol and a volume of this solution (which may be diluted with water) containing from 5 to 100 mg. of dye is slowly added to about 1000 cc. of an ordinary flowable gelatino-silver-halide emulsion with stirring. The dye is thoroughly incorporated. With the more powerful of my new sensitizing dyes, 10 to 20 mg. of dye per 1000 cc. of emulsion will suffice to produce maximum sensitizing effects with the ordinary gelatino-silver-halide emulsion.

The above statements are only illustrative and are not to be understood as limiting my invention in any sense, as it will be apparent that these dyes can be incorporated by other methods in many of the photographic emulsions customarily employed in the art, such, for instance as by bathing a plate or film, upon which an emulsion has been coated in a solution of the dye in an appropriate solvent, although such a method is ordinarily not to be preferred. The claims are intended to cover any combination of my new dyes with a photographic emulsion, whereby the dyes exert a sensitizing effect upon the emulsion as well as a photographic element comprising such emulsions, such for instance as a support, ordinarily transparent, upon which the light-sensitive emulsion is coated or spread and permitted to set or dry.

Figure 2:
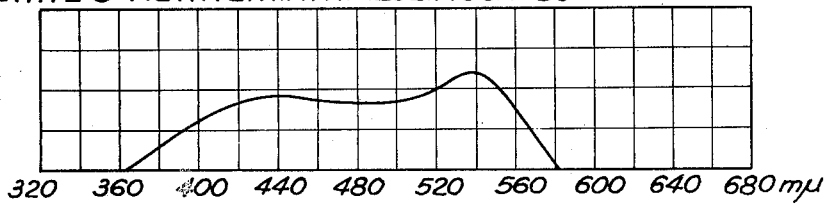
Figure 3:
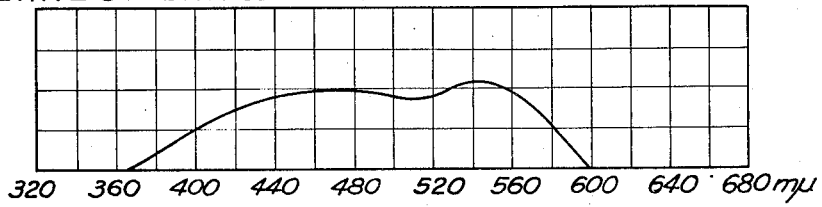
Figure 4:
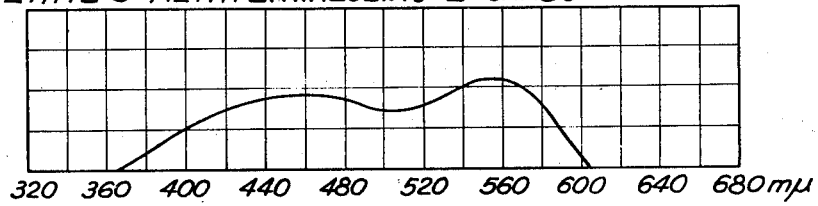

The accompanying drawing is by way of illustration and depicts the sensitivity of emulsions containing four of my new dyes. Each figure of the drawing is a diagrammatic reproduction of a spectrogram depicting the sensitivity of an emulsion containing one of my new dyes. In Fig. 1, the curve represents the sensitivity of an ordinary gelatino-silver-bromide emulsion containing 2,3'-diethylthiathiazolinocarbocyanine iodide. In Fig. 2, the curve represents the sensitivity of an ordinary gelatino-silver-bromide emulsion containing 2-ethyl-3'-methylthiathiazolinocarbocyanine iodide. In Fig. 3, the curve represents the sensitivity of an ordinary gelatino-silver-bromide emulsion containing 2-ethyl-3' - methylselenathiazolinocarbocyanine iodide. In Fig. 4, the curve represents the sensitivity of an ordinary gelatino-silver-bromide emulsion containing 1'-ethyl-3-methylthiazolino-2'-carbocyanine iodide.

Those of my new unsymmetrical thiazolino dyes containing benzothiazole, benzoxazole, benzoselenazole, naphthothiazole and naphthoxazole nuclei are particularly useful in sensitizing photographic emulsions.

Still further examples of my new dyes and of photographic emulsions sensitized therewith could be given, but the foregoing are believed to teach those skilled in the art the manner of practicing my invention.

What I claim as my invention and desire to be secured by Letters Patent of the United States is:

1. A dye of the following formula:

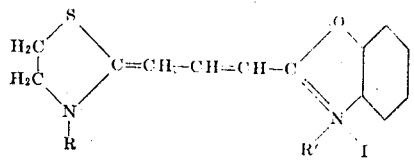

wherein R and R' represent alkyl groups.

2. A dye of the following formula:

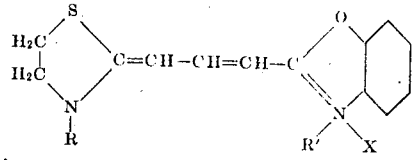

wherein R and R' represent alkyl groups and X represents an acid radical.

3. A dye of the following formula:

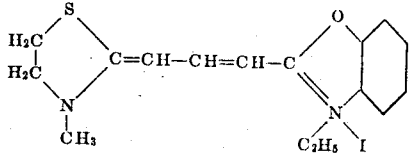

4. A dye of the following formula:

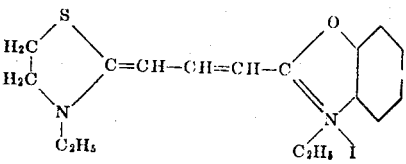

LESLIE G. S. BROOKER.

Certificate of Correction

January 12, 1943.

Patent No. 2,307,916.

LESLIE G. S. BROOKER

It is hereby certified that errors appear in the printed specification of the above numbered patent requiring correction as follows: Page 2, first column, lines 7 to 12 inclusive, Example 1, for that portion of the formula reading

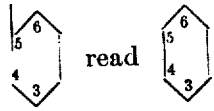

page 4, first column, line 6, for "July 11, 1936" read *July 11, 1939*; and that the said Letters Patent should be read with these corrections therein that the same may conform to the record of the case in the Patent Office.

Signed and sealed this 16th day of March, A. D. 1943.

[SEAL]

HENRY VAN ARSDALE,
*Acting Commissioner of Patents.*